US006143378A

United States Patent [19]

Harwell et al.

[11] Patent Number: 6,143,378

[45] Date of Patent: Nov. 7, 2000

[54] ENERGETIC ADDITIVE MANUFACTURING PROCESS WITH FEED WIRE

[75] Inventors: Lane D. Harwell; Michelle L. Griffith, both of Albuquerque; Donald L. Greene, Corrales; Gary A. Pressly, Sandia Park, all of N. Mex.

[73] Assignee: Sandia Corporation, Albuquerque, N. Mex.

[21] Appl. No.: 09/076,402

[22] Filed: May 12, 1998

[51] Int. Cl.[7] .................................................... C23C 14/14

[52] U.S. Cl. ......................... 427/597; 427/264; 427/271; 427/287; 427/307; 427/318; 427/327; 427/537; 427/540; 427/552; 427/555; 427/576; 427/580; 427/595; 427/596

[58] Field of Search .................................... 427/537, 540, 427/552, 555, 576, 580, 595, 596, 597, 264, 271, 287, 307, 318, 327

[56] References Cited

U.S. PATENT DOCUMENTS 4,323,756 4/1982 Brown et al. .......................... 219/121

*Primary Examiner*—Bernard Pianalto

*Attorney, Agent, or Firm*—Brian W. Dodson

[57] ABSTRACT

A process for additive manufacture by energetic wire deposition is described. A source wire is fed into a energy beam generated melt-pool on a growth surface as the melt-pool moves over the growth surface. This process enables the rapid prototyping and manufacture of fully dense, near-net shape components, as well as cladding and welding processes. Alloys, graded materials, and other inhomogeneous materials can be grown using this process.

14 Claims, 4 Drawing Sheets

24

20

25

20

23

22

ENERGETIC ADDITIVE MANUFACTURING PROCESS WITH FEED WIRE

This invention was made with Government support under Contract DE-AC04-94DP85000 awarded by the U.S. Department of Energy. The Government has certain rights in the invention.

BACKGROUND

The present invention relates generally to the field of additive manufacturing techniques, and, more particularly, to a new class of processes for rapid prototyping and manufacture of complex, fully dense three-dimensional components.

Complex three-dimensional components can be created by additive manufacturing processes following the following general procedure. Decompose the desired component design into a series of material layers, partitioned into solid and absent portions, to be grown one on top of another, thereby forming the desired component. Note that the individual material layers need not be flat. The only restriction is that they collectively form a foliation of the desired component design.

The growth apparatus comprises elements which carry out the following process steps. Direct an energy source (e.g., a laser beam) onto the growth surface (initially onto a substrate, later onto the previously grown material layer), thereby forming a localized melt-pool (a molten puddle) on the growth surface. A feed material is then fed into and incorporated into the melt-pool (e.g., by melting and alloying with the liquid of the melt-pool, or by dissolving and forming a solution with the liquid of the melt-pool) to provide additional material to the workpiece. The feed material preferably remains solid until actually in contact with the liquid of the melt-pool, differentiating the instant invention from, e.g., laser spray processes in which the feed material is liquefied away from the growth surface, sprayed thereon from a distance in liquid form, and freezes on the growth surface as individual droplets. Introduction of the feed material forces a portion of the original melt-pool to solidify at the melt-pool/growth surface interface, thereby forming a new material layer.

The growth apparatus is rastered along the growth surface to add material to regions of the material layer being grown which are to be solid in the final component design. The rastering process may require full 6-axis motion and control of the growth apparatus to properly manufacture complex components. Continue until the material layer being grown is complete. Repeat the layer growth process until all material layers are grown and the desired component is completed. Given appropriate process conditions, the resulting component can have material properties equal to or exceeding those of the best bulk alloys. Depending on the ultimate application, the component may be ready for immediate use once the additive process is finished, or may require additional finishing steps (e.g., polishing, fine machining, etc.). The above technique, and variants thereof which are clear to one skilled in the art, shall herein be generically referred to as additive manufacturing.

In addition to component manufacture, this general procedure can be adapted to form a single or multiple surface layer on a prefabricated component, an internal portion of a prefabricated component, to welding discrete pieces of a component together, or to forming a billet from which a component will later be machined. The energy source which forms the melt-pool typically comprises a laser beam, but may comprise, with appropriate adaptations, an electron beam, an ion beam, a cluster beam, a plasma jet, an electrical arc, or any other suitably concentrated and intense form of energy source.

There are two primary approaches extant to feeding the filler material into the melt-pool to grown a new layer. First is a powder delivery system, where a fine powder is delivered to the work surface, typically by an inert atmosphere carrier jet. Such systems typically incorporate less than 20% of the powder into the melt-pool, some of the remainder building up on the deposition apparatus and the work surface and some escaping into the local environment. This build up of powder causes difficulty in achieving the desired surface finish, and eventually interferes with the basic function of the laser deposition system. Escape of fine powders into the general environment can present a safety hazard, from the point of view of both health concerns and fire safety. There are stringent OSHA regulations which must be followed to use fine powders in a general manufacturing environment. The special accommodations which are needed to safely operate a powder-based layerwise laser deposition system limit practical application thereof.

The second technique to introduce the filler material into the melt-pool is wire feed, in which a thin wire (wire diameter typically 10–50% of the melt-pool diameter) is fed into the melt-pool. It melts therein and supplies the required growth material for the new layer. The rate of layer growth is primarily related to the spatial extent of the melt-pool, the velocity with which the growth apparatus is rastered along the growth surface, and the rate at with the feed wire is fed into the melt-pool. (Note that this differs intrinsically from systems in which powders, wires, or laminations are arranged in the pattern of the desired layer and welded or sintered to the growth surface.) The rate of deposition can be significantly larger than those generally obtainable using laser powder deposition techniques with the same processing conditions.

FIG. 1 illustrates a typical system as described in U.S. Pat. No. 4,323,756. Here a single laser 10 is focused substantially along a normal onto a growth surface 11, thereby creates a melt-pool 12. A feed wire 13 is directed into melt-pool 12 either from the leading edge or into the side of the melt-pool. (The orientation of the melt-pool is relative to the direction in which the laser beam is rastered along the growth surface.)

The above technique is adequate for simple bi-directional motions of the melt-pool, such as may be encountered in simple laser cladding. To form a complex three-dimensional component in the above manner, however, requires the ability to feed the wire into the melt-pool at any arbitrary radial angle. When fabricating a three-dimensional component using an apparatus having a fixed direction of wire feed, the wire will at times be fed into the true trailing edge of the melt-pool. In this worst-case configuration, the pool/wire interface becomes unstable, and the wire will freeze to the growth surface, stopping the growth process and ruining the component. Beyond this obvious difficulty, such systems tend to produce material layers having large and substantially uncontrolled variations in thickness.

There is therefore a need for a layerwise wire deposition manufacturing process which feeds a feed wire into a laser-generated melt-pool in a manner compatible with true three-dimensional additive growth and fabrication. The process must allow practical growth rates (>1 cc/hr) when used for additive manufacturing. Such a process will enable rapid prototyping and manufacture of prototype assemblies, small quantities of components, and precision molds, and will also be useful for application of surface coatings, repairing mechanical components, general laser welding, and manufacture of special materials.

SUMMARY

The present invention relates generally to a process for manufacturing components, said process comprising energetic additive manufacturing with wire feed, wherein at least one material layer of said component is grown by forming a melt-pool on a growth surface, feeding one or multiple source wires into the melt-pool, which thereby melt or dissolve, thereby forming an alloy with the material of the growth surface, and moving the melt-pool across the growth surface.

BRIEF DESCRIPTION OF THE DRAWINGS

The accompanying drawings, which are incorporated in and form part of the specification, illustrate the present invention and, together with the description, serve to explain the invention.

DESCRIPTION

Figure 1:
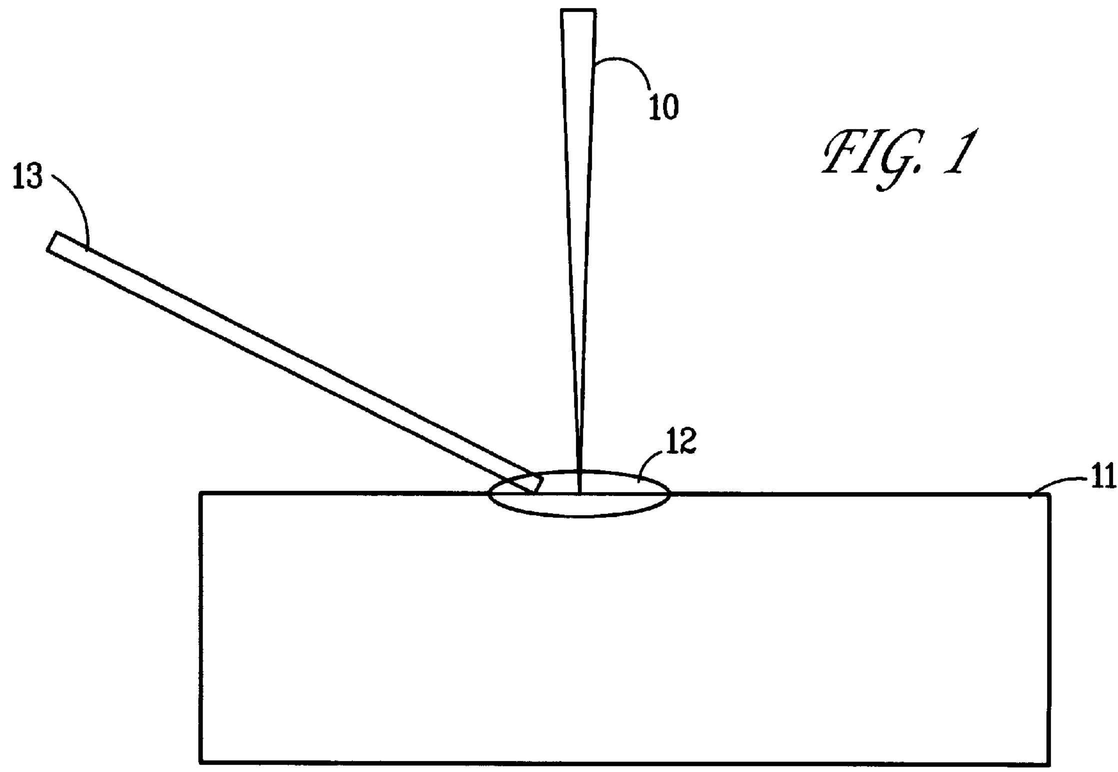
FIG. 1. Schematic illustration of an extant laser wire deposition system.

The present invention describes energetic additive manufacturing systems with wire feed having the ability to produce truly three-dimensional components using additive manufacture.

The essence of the present invention is to direct the feed wire into the central portion of the melt-pool at an angle substantially normal to the surface of the melt-pool while maintaining a substantially spatially symmetric melt-pool thermal environment. (By "substantially normal" we mean an angle close enough to normal orientation that the present invention functions correctly. The maximum misorientation allowed from the true normal will vary with the materials system and the process conditions being used. By "substantially symmetric", we refer to rotational symmetry about the center of the melt-pool. As will be discussed later, in some circumstances small asymmetries will aid the additive manufacturing process, and such asymmetries are intended to be included in the term "substantially symmetric".) This approach minimizes dynamic forces acting on the feed wire during arbitrary motions of the melt-pool, while at the same time isolating the end of the feed wire from the unstable interactions likely to be encountered near the edges of the melt-pool. As a result the problem of the feed wire freezing onto the growth surface of the component is greatly reduced over earlier technologies.

Previous energetic additive manufacture techniques with wire feed have directed a single laser beam onto the growth surface in a substantially normal orientation relative to that surface. As the present invention requires that the feed wire also be directed with substantially the same orientation, one or both of the feed wire and the mechanism which directs the motion of the feed wire will obstruct the laser beam. In addition, to the extent that the laser beam intersects the feed wire above the growth surface, it will generally reflect that portion of the laser beam away from the desired melt-pool location.

Such design conflicts lead to inefficient use of laser energy, uneven heating of the melt-pool, and excessive heating of the feed wire prior to contact with the melt-pool. These effects are undesirable. Aside from wastage of the energy beam, uneven heating of the melt-pool leads to uneven layer thickness and encourages instabilities during the growth process. Finally, heating the feed wire prior to contact with the melt-pool can prematurely melt the feed-wire, leading to formation of drops, poor surface finish, and irregular growth dynamics.

One approach to reducing premature interaction of the laser beam (hereafter "energy beam" and "laser beam" shall be considered equivalent terms, as shall related terms such as "energy irradiation" and "laser irradiation", and shall include all directed energy sources called out in the claims) and a substantially normal feed wire is to form the melt-pool by the action of multiple laser beams directed obliquely onto the melt-pool. (The multiple laser beams can be formed by discrete lasers, by splitting the output of a source laser, or by a combination thereof.) A single obliquely directed laser beam is undesirable, as it leads to uneven heating of the melt-pool and surrounding regions of the growth surface. At least a pair of oblique laser beams is required in the present invention to produce a sufficiently symmetric melt-pool environment for reliable three-dimensional fabrication. (Note that a slight asymmetry of the laser irradiation on the compact region on the growth surface can lead to improved performance. For example, such can be used to offset the symmetry-breaking effect of the motion of the melt-pool across the growth surface by preferentially preheating a small part of the growth surface just in front of the leading edge of the melt-pool.)

Figure 2:
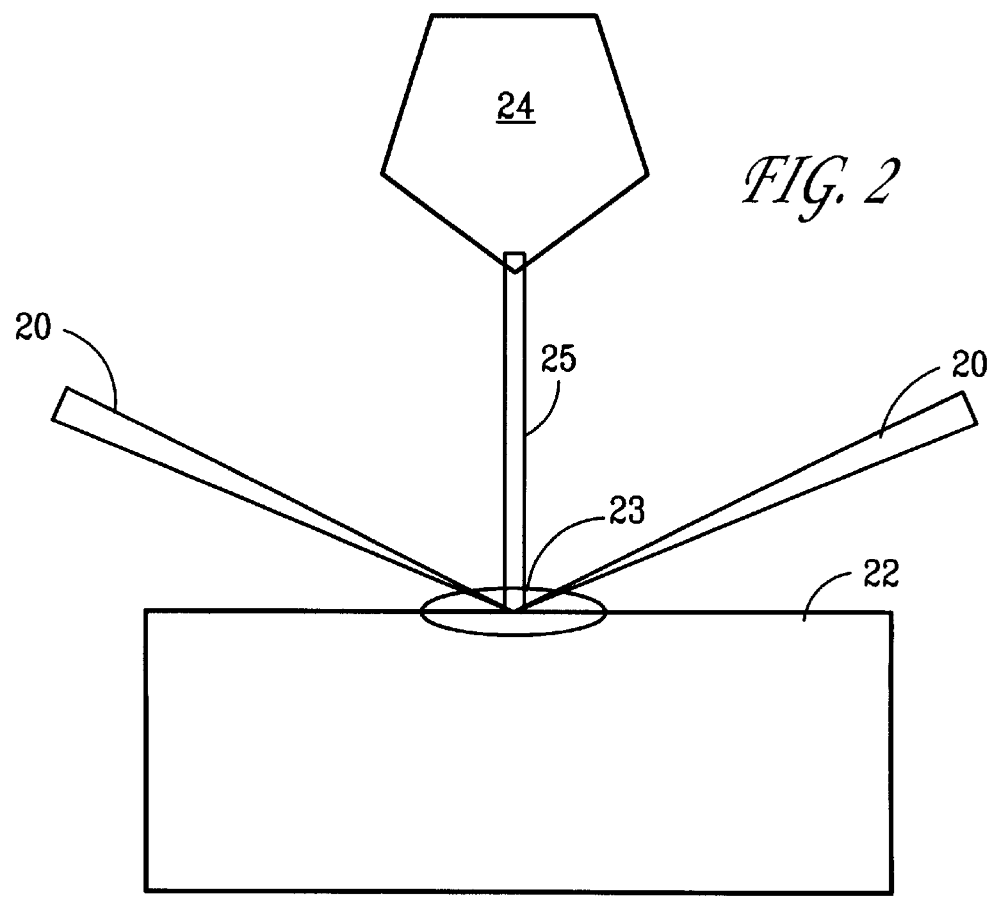
FIG. 2. Schematic illustration of a laser wire deposition system according to the present invention.

An embodiment of the present invention is shown in FIG. 2, where multiple laser beams 20 (there could be any convenient number of laser beams) are obliquely directed and concentrated by directing means (not shown) onto a growth surface 22, forming thereon a melt-pool 23. (The directing means need not produce a focal point located at the growth surface. The goal is to provide an appropriate level of laser energy to form a suitable melt-pool on the growth surface, not to maximize the laser energy density at the growth surface.) A wire-feed apparatus 24 directs a feed wire 25 into the center of the melt-pool, thereby supplying material for growth of a surface layer. The wire-feed apparatus 24 and the feed wire 25 are so arranged that they do not interfere significantly with laser beams 20.

Using an apparatus of the type schematically outlined in FIG. 2, Applicants have demonstrated additive manufacture of components from various steel alloys. The components exhibited substantially ideal density expected for the materials of which they were composed.

Figure 3:
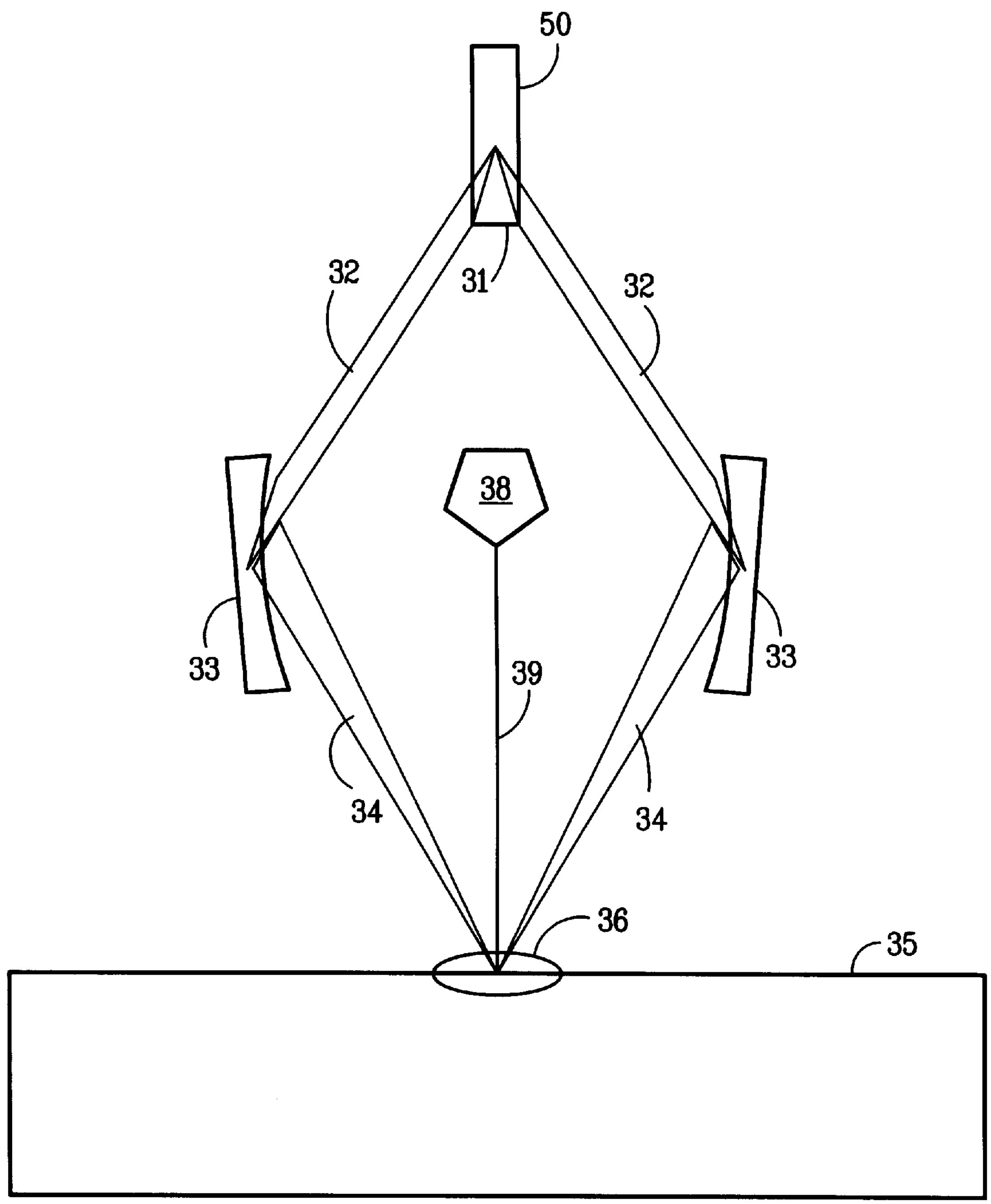
FIG. 3. Schematic illustration of a laser wire deposition system according to the present invention comprising cylindrical optics.

An alternative to the use of multiple oblique laser beams focused in the region of the melt-pool is to split a single laser beam into several diverging portions and then to use a set of focusing optics to redirect and focus the laser excitation onto a small region of the growth surface. Such an embodiment of the present invention is shown in FIG. 3. A laser beam 30 is reflected from a pyramidal reflecting element 31, thereby forming a divergent set of laser beams 32. The divergent set of laser beams 32 then intersect a set of focusing optics 33, which act to redirect the divergent set of laser beams 32 into a converging hollow laser beam 34 directed onto the growth surface 35. Beam 34 heats a small region of growth surface 35, forming thereon a melt-pool 36. Wire-feed apparatus 38 is arranged within the divergent set of laser beams 32 and within the converging hollow laser beam 34 so that feed wire 39 is fed substantially normally into the center of the melt-pool 36 while wire-feed apparatus 38 does not interfere with the laser beams.

The embodiment in FIG. 3 exhibits equivalent function if the pyramidal reflecting element 31 is replaced by a conical reflecting element 31, and the set of focusing optics 33 is replaced by a cylindrically symmetric focusing optic 33. Instead of a diverging and converging set of discrete laser beams, a cylindrically symmetric diverging and converging hollow cone of light is thereby formed.

Note that although both reflecting element 31 and the set of focusing optics 33 are described as mirrors in this figure, either or both can take on other forms, including refracting optics and diffractive optics. Additionally, neither cone 31 nor optic 33 need be cylindrically symmetric. The desired feature is to produce a hollow converging laser beam which creates a melt-pool in a desired location on the growth surface. This laser wire deposition system is then rastered over growth surface 35 in accordance with additive manufacturing principles so as to form the desired component.

Figure 4:
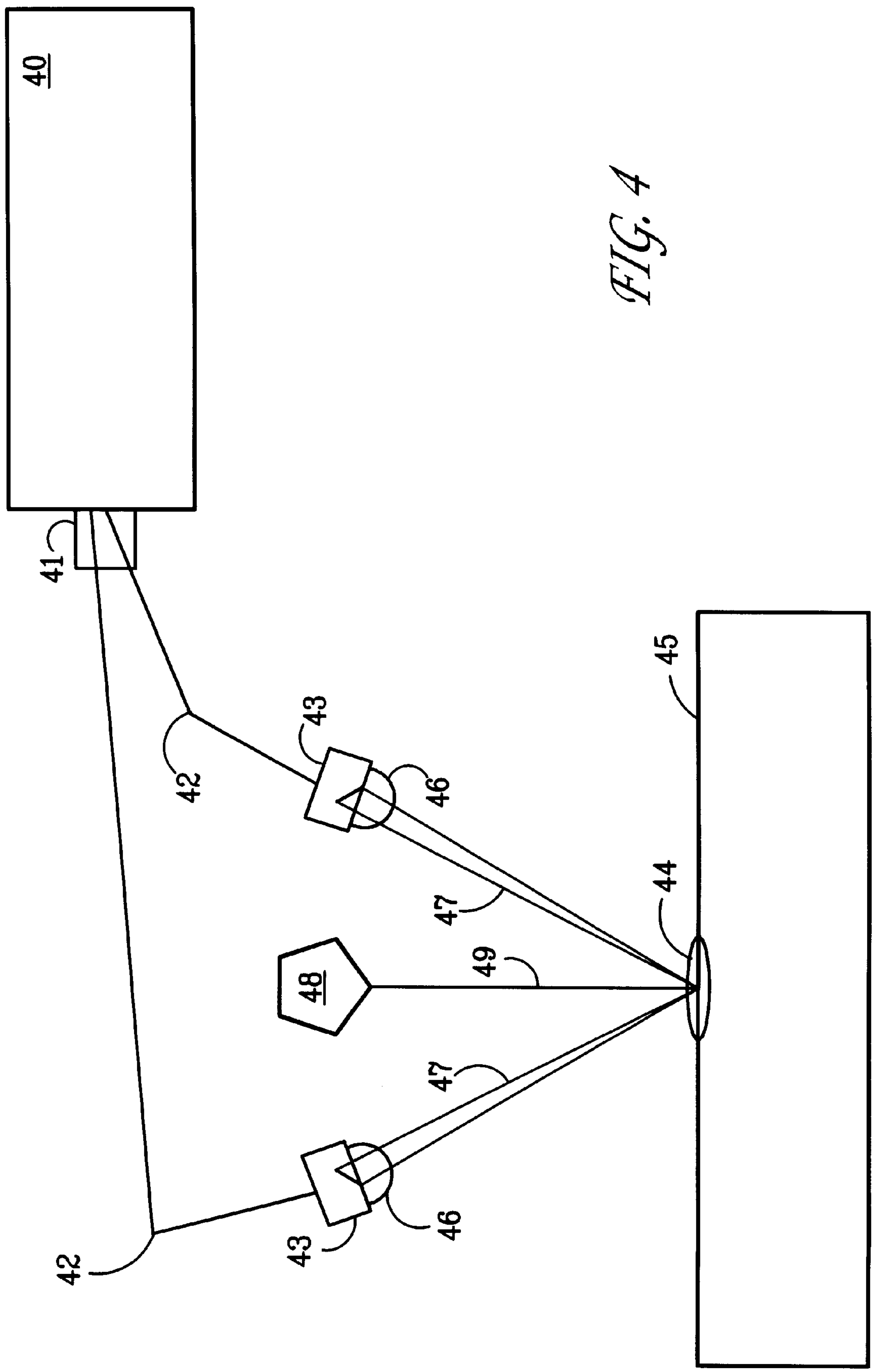
FIG. 4. Schematic illustration of a laser wire deposition system according to the present invention comprising a cylindrical fiber optic.

A hollow converging laser beam can also be produced using fiber optics, as illustrated by the embodiment of the present invention shown in FIG. 4. Here a laser source 40 is directed into a fiber optic bundle 41, comprising numerous fiber optics 42. The individual fiber optics 42 are attached to an annulus 43 surrounding the desired location of the melt-pool 44 on the growth surface 45. Directing means 46 are introduced to direct the laser light 47 emerging from the individual fiber optics 42 onto the desired region of the melt-pool. (Depending on geometry and the characteristic properties of the fiber optics 42, the directing means may comprise a focusing lens for each fiber optic, a non-focusing optical concentrator, simply pointing the ends of the fiber optics at the desired melt-pool locations, or other possibilities clear to one skilled in the art.) The feed wire 48 is directed onto the melt-pool by wire feed apparatus 49.

Other approaches to providing laser excitation of the growth surface which allows substantially normal insertion of a feed wire into the central region of a melt-pool while still providing a sufficiently symmetric melt-pool environment for practical three-dimensional fabrication are possible, and will be clear to one skilled in the art. All such approaches are intended to be included in the scope of the present invention.

The operating parameters of the present invention depend on each other in a complex manner, with routine experimentation being required to establish optimal operating conditions for any given additive manufacturing project. A useful rule of thumb, however, is to first choose the spatial extent of the desired melt-pool, and focus the laser excitation onto a region of the growth surface having essentially that size. The laser power is then adjusted until a melt-pool forms when the laser beam is rastered over the growth surface at the desired velocity. The laser power is then increased until the feed wire, which is being fed into the melt-pool at a velocity intended to produce a desired layer thickness, melts smoothly into the melt-pool. Successful growth will take place under these conditions.

Other aspects of the present process can be favorably influenced by controlling the spatial distribution of the laser excitation. The use of a small asymmetry in laser excitation to counteract the thermal asymmetry caused by motion of the melt-pool over the growth surface has already been mentioned.

A common difficulty encountered in the present process is that the feed wire moves around in the melt-pool under the influence of convection currents and differences in surface energies driven by non-uniform temperatures in the melt-pool and its surroundings. Such effects can at times lead to unstable injection of the feed wire into the melt-pool, resulting in uneven growth and, in extreme cases, freezing the feed wire to the growth surface.

The feed wire is attracted to regions of the melt-pool having superior wetting properties. In most material systems the wetting of the feed wire is a function of temperature. This temperature-dependence can be used to influence the feed wire to remain in an optimal position (e.g., approximately centered in the melt-pool). For example, if the material system being used exhibits maximum wetting at high temperatures, the laser excitation can be applied preferentially to the central region of the melt-pool. As a result the temperature of the central region is slightly higher than that of the surrounding material, and the feed wire is attracted to the central region. Conversely, if maximum wetting occurs at lower temperatures, the laser excitation can be applied preferentially to an outer annulus of the melt-pool. The central region will then have a slightly lower temperature than does the surrounding material, and the feed wire is again attracted to the central region.

Process parameters for the instant invention must be such that the feed wire becomes incorporated into the melt-pool. This requires that the feed wire either melts within the liquidus range of the growth surface or dissolves in the melt-pool material within the liquidus range of the growth surface. Although this condition is trivially satisfied when the feed wire and the growth surface have substantially identical chemical compositions, in the more general case it forms a constraint on applying the present invention.

An additional concern involves the mutual solubility of the feed wire and the growth surface. To obtain predictable and consistent growth, the feed wire and the growth surface are usually chosen to be miscible within the melt-pool. Otherwise the melt-pool will divide into heterogeneous regions, whose spatial distribution will depend in complex and potentially unpredictable ways on many process variables.

At first glance it might appear that the feed wire and growth surface should also be miscible in the solid form to avoid unwanted inhomogeneities and microstructures resulting from differential solidification of these components. In some cases, however, the rate of cooling when the melt-pool moves across the surface is large enough to prevent immiscible components from separating during solidification, thereby forming a metastable crystalline structure. In addition, at times a superior product results when controlled inhomogeneities and/or microstructures are produced. Immiscibility in the solid state is thus a concern, but does not present a fundamental constraint on the present invention.

Most commonly, the instant invention will be used to form components from metals and metal alloys. However, this is not a fundamental restriction of the technique. As described above, the principal requirement is that the feed wire must melt (or dissolve) into the melt-pool at a temperature within the liquidus range of the growth surface, and that the feed wire and the growth surface are usually freely miscible. It is thus possible to fabricate, using the present invention, components from a range of thermoplastic polymers which melt without degradation, such as polymethylmethacrylate. Components made of inorganic glasses where the feed wire is a thin fiber is also possible.

An example of growth of a metal-ceramic composite using the present invention is provided by injecting a gold feed wire into a melt-pool on a germanium growth surface. The resulting structure is a composite because, although liquid gold and liquid germanium are freely miscible, gold and germanium are almost totally immiscible as solids. Diffusion of gold in solid germanium is facile enough that, even at room temperature, the gold and germanium will separate, thereby forming a composite material comprising a dispersion of submicron gold particulates in a germanium matrix.

The above examples illustrate how one skilled in the art can determine, based primarily on thermophysical phase diagrams of the materials chosen, if a desired combination of feed wire and growth surface is compatible with layer-wise manufacture using the present invention.

The instant process is intended to add material to a growth surface in a additive manner so as to build up a desired component. Additive manufacturing of nearly completed components has been the focus of the above discussion, but one skilled in the art will realize the instant process is also useful for cladding a surface with a material, for adding material to a weld between two pieces, for creating internal layers within a component (e.g., by creating surface layers on a piece and completing the component by welding another piece on top of the surface layers), and even for creating billets of unusual materials ready for machining into components.

An example of this latter application would be production of a component made of a graded alloy having very small thermal conductivity, where the final form of the component has thin fins. If the fins are thin enough, the small thermal conductivity between the melt-pool and a good thermal heat sink can render energetic wire additive manufacture an inappropriate technique. (This is essentially because the melt-pool becomes uncontrollable in this geometry and material system. A more serious incapacity emerges if a microstructure resulting from rapid cooling is desired.) However, a billet or preform having the proper material properties can be made using additive manufacturing techniques, and the component machined from that billet using appropriate machining techniques.

Figure 5:
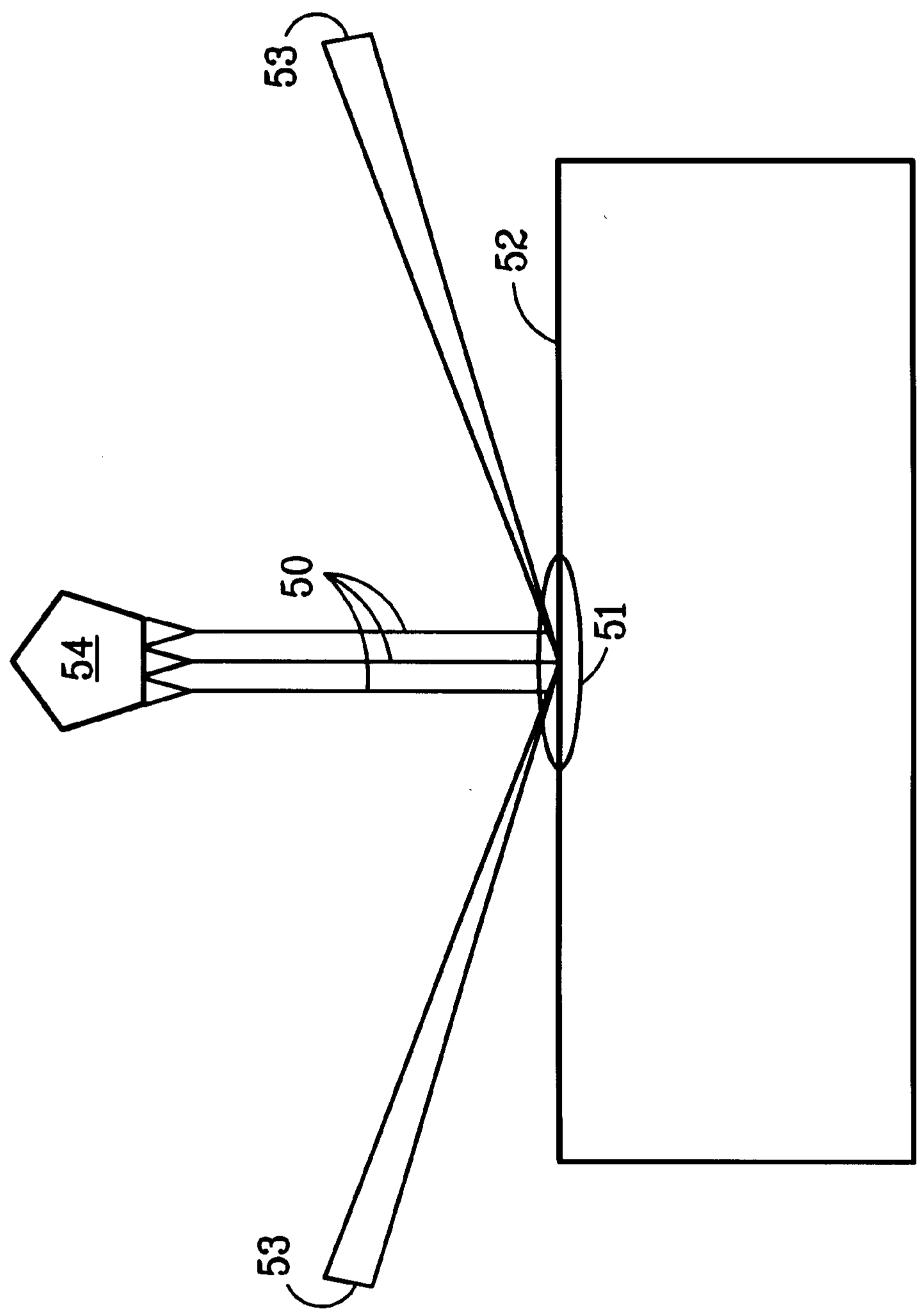
FIG. 5. Schematic illustration of multiple feed wires entering a melt-pool on a growth surface according to the present invention.

A useful extension of the instant invention as described above is the use of multiple feed wires, as illustrated in FIG. 5. Here multiple feed wires 50 are fed by multiple wire feeder 54 into the central region of a melt-pool 51 at an angle substantially normal to the surface of the melt-pool. The melt-pool 51 is generated on a growth surface 52 by the action of multiple laser beams 53. The multiple feed wires may have the same composition, or may have differing compositions, forming an alloy within the melt-pool from which the component is formed.

When multiple layers are laser wire deposited in the process of manufacturing a component, those layers can all have the same chemical composition, thereby forming a substantially homogeneous component. Alternately, any of the multiple layers can be formed with its own individual composition. The composition of an individual layer is a function of the composition of the growth surface for that layer, the composition of the feed wire or wires used to grow that layer, the laser power, the rate of wire feeding, and the rate of motion of the melt-pool on the surface, among other lesser variables. This is because the melt-pool is partly composed of material from the growth surface and partially of material from the feed wire. These materials form a liquid alloy whose proportions depend on the variables listed above.

Individual material layers of varying composition are beneficially used within a component, e.g., to form regions of graded material, to create obstacles to dislocation motion, to create regions weak against mechanical deformation (failure zones), or to concentrate applied stress in regions of strong material. (A classical example of improved properties is a Japanese katana blade, which is composed of alternating layer of soft and hard steel, each layer of which is a few microns thick. Such a blade exhibits a better combination of hardness and toughness for this application than does any homogeneous blade composed of similar materials.) A component comprising layers of varying composition can be manufactured using the present invention by using different feed wires for different regions or by controlling the relative rates at which multiple feed wires of different composition are fed into the melt-pool.

It is often useful to manufacture a component comprising a region of graded material. Such regions can solve problems of differential thermal expansion or poor weldability between sections of a component. Vertically graded material (i.e., grading normal to the growth surface) can be formed by slowly changing the rate at which multiple feed wires of different composition are fed into the melt-pool before each new layer is formed.

Graded material of arbitrary orientation can also be formed by changing the composition of the material layers during their growth, thereby producing a compositionally inhomogeneous material incorporating nearly arbitrary (within the limits of the materials being used) compositional gradations.

A flexible approach to changing the composition of a single material layer is to use multiple feed wires having different composition, -and change the relative rate at which the individual wires are fed as the layer is grown. This technique can produce exquisitely detailed graded materials, subject to the above-mentioned constraints and limitations of the instant invention, whose precise internal structure can vastly improve the performance of a desired component.

The specific embodiments of the present invention and the examples of its-use described above are for purposes of illustration only, and are not intended to limit the scope of the present invention. That scope is defined only by the claims appended.

What is claimed is:

1. A process for additive manufacture of a component by process steps comprising:

i. directing an energy beam onto a growth surface, forming thereon a liquid melt-pool comprising a central region and a top surface; and, ii. moving the energy beam, and with it the melt-pool, across the growth surface while feeding a source wire into the central region of the melt-pool so that the source wire becomes incorporated into the liquid of the melt-pool as needed to fabricate the component.

2. The process of claim 1, wherein the source wire is fed into the central region of the melt-pool at an angle tantially normal to top of melt-pool at the point of feed.

3. The process of claim 1, wherein multiple energy beams are directed obliquely onto a region of the growth surface, forming thereon the melt-pool.

4. The process of claim 3, further comprising directing the multiple energy beams so that the temperature distribution of the melt-pool is substantially rotationally symmetric about the central region of the melt-pool.

5. The process of claim 4, wherein the source wire is fed into the central region of the melt-pool at an angle substantially normal to the top surface of the melt-pool at the point of feed.

6. The process of claim 3 wherein some of the multiple energy beams are generated by dividing the energy output of a single energy source.

7. The process of claim 3, wherein multiple source wires are fed into the central region of the melt-pool and become incorporated into the liquid of the melt-pool.

8. The process of claim 7 wherein at least two of the multiple source wires have substantially differing compositions.

9. The process of claim 8, further comprising controlling the local composition of the component by controlling the relative rates at which each of the multiple source wires are fed into the melt-pool.

10. The process of claim 1 wherein the energy beam is a laser beam.

11. The process of claim 1 further comprising forming said energy beam into a hollow energy beam converging onto the growth surface.

12. The process of claim 11 wherein the hollow energy beam is substantially rotationally symmetric about the central region of the melt-pool.

13. The process of claim 11, wherein the source wire is fed into the central region of the melt-pool at an angle substantially normal to the top surface of the melt-pool at the point of feed.

14. The process of claim 1 wherein the direction of the energy beam onto the growth surface results in a spatial distribution of melt-pool temperatures which tends to retain the feed wire in the melt-pool.

* * * * *